April 27, 1943.  M. MALLORY  2,317,625
CARBURETOR FOR INTERNAL COMBUSTION ENGINES
Filed Oct. 7, 1940
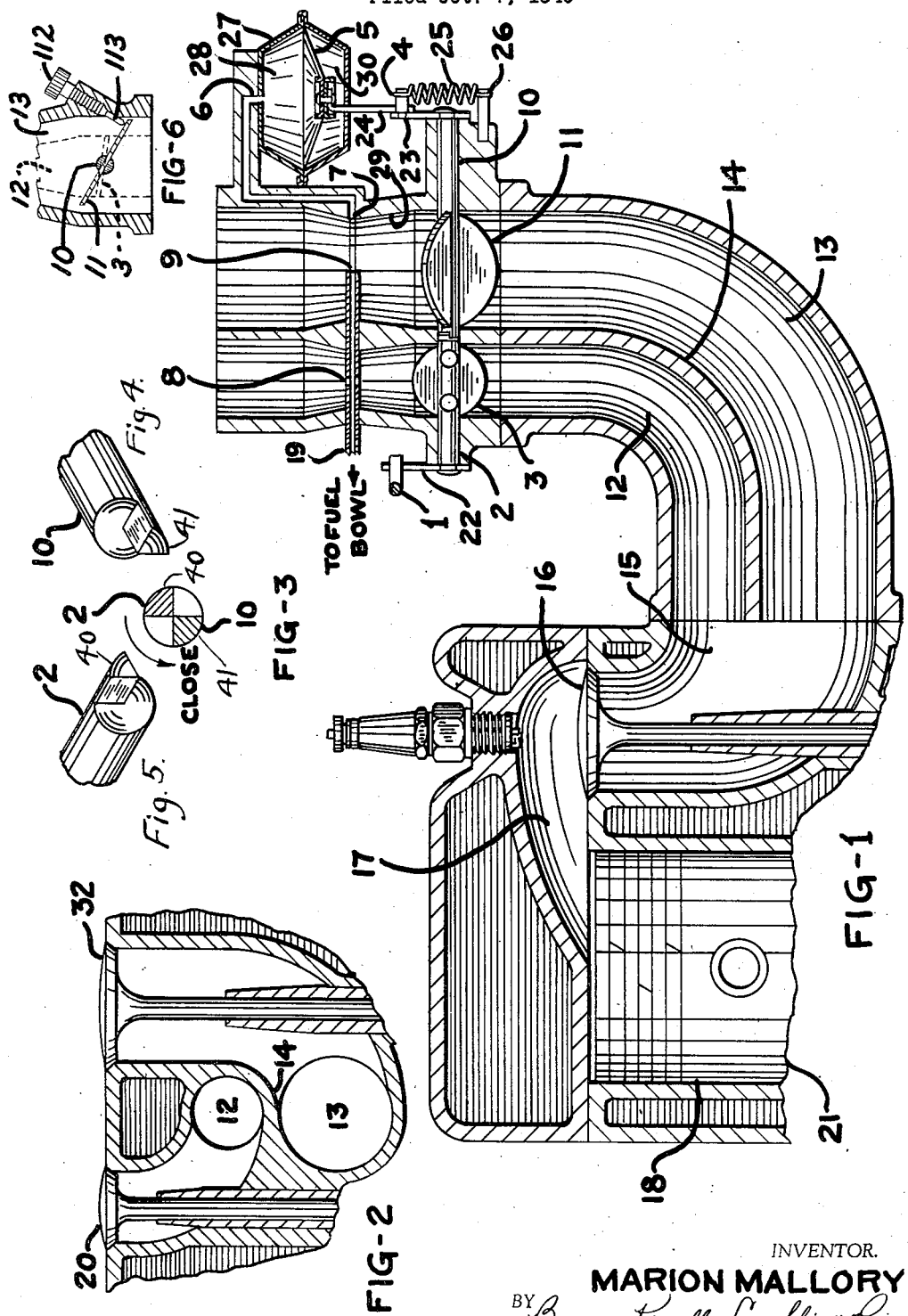
INVENTOR.
MARION MALLORY
BY
ATTORNEYS.

Patented Apr. 27, 1943

2,317,625

UNITED STATES PATENT OFFICE 2,317,625

CARBURETOR FOR INTERNAL COMBUSTION ENGINES

Marion Mallory, Detroit, Mich.

Application October 7, 1940, Serial No. 360,095

12 Claims. (Cl. 123—127)

This invention relates to a carburetor for an internal combustion engine.

In the operation of internal combustion engines the higher the compression at the time of the combustion the greater the power that is developed by the engine. When an engine is operating at high speed, obviously it has less time in which to draw a charge into the cylinder than when it is running at low speeds. Thus, when the engine is provided with a carburetor having an intake passageway of fixed size, the compression will be higher at low speeds than at high speeds. If the intake passageway is designed so that it will give the proper high compression at high engine speeds, then the cylinder will overcharge at lower speeds causing such a high compression that detonation will result. If, on the other hand, the intake passageway is designed so that the charge drawn into the cylinder at low engine speed will produce the proper high compression, then at higher engine speeds the cylinders will undercharge and operate at a lower compression with a resultant loss in economy.

Where the intake passageway is unrestricted and designed to give a full charge at high engine speed, then at low engine speed, the velocity of the fuel-air charge in the intake passageway will be low. At low intake velocity the air will not properly and effectively atomize and intermix with the gasoline or other fuel drawn through the fuel nozzle.

It is the object of this invention to control the charge drawn into the engine cylinders so that a substantially constant predetermined compression will be maintained in the cylinders at all engine speeds.

This invention also contemplates maintaining high velocities in the intake passageway of the engine when the engine is being operated at low speeds.

In the drawing:

Fig. 1 is a vertical cross section through a portion of an internal combustion engine and the carburetor which is the subject matter of this application showing valve 3 wide open and valve 11 closed.

Fig. 2 is a fragmentary vertical section thru a modified form of the invention wherein the cylinder is provided with two independent valve controlled intake passageways.

Fig. 3 is a vertical section thru throttle shafts 2 and 10 where they butt together with valve 3 wide open and valve 11 closed.

Figs. 4 and 5 are details of shafts 10 and 2 respectively.

Fig. 6 is a detail vertical sectional view showing a balanced suction controlled throttle valve.

Referring more particularly to the drawings there is shown an internal combustion engine having a cylinder 18 and the usual reciprocating piston 21. The combustion chamber is designated 17.

As explained below, the fuel mixture charge is drawn into the combustion chamber 17 through intake passageways 12 and 13 which converge into a single passageway 15 which communicates with the combustion chamber 17. Intake passageway 15 is controlled by the conventional cam operated poppet valve 16. The intake passageways can be of the same size or cross sectional area or the one can be smaller than the other. By way of example, intake passageway 12, as herein shown, is smaller, that is, has a smaller cross sectional area than the intake passageway 13. Thus, intake passageway 12 offers more resistance to the flow of the fuel-air charge into the combustion chamber than does the larger passageway 13. The intake passageways 12 and 13 are separated by a dividing wall 14. Liquid fuel, such as gasoline, is fed into the intake passageway through conduit or pipe 19 which connects to the conventional fuel bowl of the carburetor (not shown).

Pipe line 19 is provided with a fuel orifice or outlet 8 in passageway 12 and an outlet 9 in passageway 13. Intake passageway 12 is controlled by a throttle valve 3 mounted on shaft 2 which is journaled in the carburetor housing. The throttle valve 3 is manually controlled through lever 22 fixed on shaft 2 and connected with rod 1. Rod 1 is connected with the conventional manually operated throttle lever or foot operated accelerator pedal (not shown). Intake passageway 13 is provided with a throttle valve 11 fixed on shaft 10 which is also journaled in the carburetor housing. Valve 11 can be either a balanced or unbalanced valve and operates independently of valve 3. Preferably valve 11 is unbalanced, that is, the area of that portion on one side above the shaft 10 is greater than the area of the portion of the valve on the other or lower side of the shaft 10.

A lever 23 is fixed on shaft 10 and pivotally connected to link 24 by pin 4. A tension spring 25 has one end fixed to pin 4 and the other end to the carburetor housing as at 26. Spring 25 always tends to close valve 11. The other end of link 24 is fixed to flexible diaphragm 5 in housing 27. Housing 27 forms a chamber 28 above the diaphragm 5 which is entirely closed except that it communicates with intake passageway 13 through passageway 6. Passageway 6 communicates through orifice 7 with the venturi 29 in intake passageway 13. Chamber 30 in housing 27 below diaphragm 5 communicates with atmosphere.

The construction of the throttle shafts 2 and 10 is shown in Fig. 3. The ends 40 and 41 of shafts 2 and 10, respectively, interengage so that when throttle 3 is closed, it will bring throttle 11 to a closed position. Of course, when throttle 3 is moved towards an open position, throttle 11 becomes a free valve and is controlled by spring 25 only.

The operation is as follows: When the engine is idling, both the manually operated valve 3 and spring loaded valve 11 are practically closed. The closing of the valve 3 closes valve 11 so as to prevent the vacuum in the intake manifold from holding valve 11 open when the engine is operating at the lower speeds, but as the small throttle valve 3 moves towards an open position, the spring 25 is all that closes or tends to close throttle 11.

As the small balanced valve 3 is opened wide for full power at low engine speeds, most all of the fuel, as well as the charge, passes through the small manifold 12 into the engine through intake valve 16. When the speed of the engine gets high enough that the passageway 12 or the small venturi tends to restrict the charge, the vacuum will increase in passageway 13 and influence opening of the valve 11 (when valve 11 is an unbalanced valve) against spring 25, permitting air to flow through the large venturi which creates suction on the diaphragm 5. This tends to assist the opening of valve 11.

As the engine speed further increases, the air flow through the large venturi will also increase. This causes the suction device to open valve 11 more and more until it is wide open to the same extent as throttle 3; thereby removing all restriction from the engine breathing at high speed.

It can be seen that the velocity will be high in the small manifold 12 at slow engine speeds because most all of the charge must pass through this small manifold 12 at slow speeds. This maintains a better atomized charge all the way between the mixing chamber of carburetor to a point close to the intake valve of the engine.

The valve 11 can be balanced, and, in this case, the suction in the intake passageway 13 will not influence its opening. It will be opened only by the suction created by the air charge flowing through the large venturi, the suction created at orifice 7 and in conduit 6 which leads into chamber 28 of the suction device.

If valve 11 is balanced, it must be set slightly open, even when valve 3 is closed, so that there will be enough air flow through passageway 13 past valve 11 to start suction in the suction device which will gradually open valve 11. If it were closed tightly, so that no air could get by, it would remain closed due to the fact that it is a balanced valve. Fig. 6 shows balanced valve 11 which is held slightly open, even when manually operated throttle valve 3 is closed, by a stop in the form of set screw 112 which is screwed into a threaded opening in the wall of the valve housing. Balanced valve 11 abuts the lower end 113 of the adjustable set screw 112 so that balanced valve 11 will not completely close passageway 13.

Of course, the suction device could be connected to the small venturi in passageway 12, but in this case, the suction would immediately drop in the small venturi when valve 11 started to open due to valve 11 bleeding more air around the small venturi. Naturally, the suction would diminish in the suction device and valve 11 would tend to close. Therefore the valve 11 should be operated by the charge that passes through large passageway 13 or the suction created by the charge that passes through large venturi 29.

In the modified form shown in Fig. 2, intake passageways 12 and 13 are independent all the way to the combustion chamber. The intake passageways are controlled by separate valves 20 and 32 which are cam operated and open and close in unison. The principal advantage of maintaining the two intake passageways separate is that the velocity of the fuel-air mixture charge flowing through the intake passageway is maintained high all the way into the combustion chamber or cylinder.

I claim:

1. In an internal combustion engine having two separate intake passageways, a fuel nozzle in each passageway, a manually controlled throttle valve in the first of said passageways, a suction responsive device connected into the second of said passageways on the atmosphere side of the throttle valve in said passageway, a throttle valve in the second passageway, a lost motion connection between said valves whereby said manually controlled valve can open independently of said second valve and said second valve can open only to the same degree as the manually controlled valve, and means connecting said latter throttle valve with said suction device whereby at low engine suction the charge is controlled by the manual valve and at higher engine suction the suction device responds to increase in velocity of air flowing through said second passageway to open commensurately said latter throttle valve.

2. In an internal combustion engine having two separate intake passageways, a fuel nozzle in each passageway, a manually controlled throttle valve in the first of said passageways, a venturi in the second of said passageways on the atmosphere side of the throttle valve in said passageway, a suction responsive device communicating with the venturi in the second passageway, a throttle valve in the second passageway, and means connecting said latter throttle valve with said suction device for controlling the opening and closing of said latter throttle valve whereby at low engine suction the charge is controlled by the manual valve and as the suction of the engine increases the suction device responds to the vacuum created by the air flowing through the venturi to open said throttle valve commensurately with the increasing velocity of the said air.

3. In an internal combustion engine having two separate intake passageways, a fuel nozzle in each passageway, a manually controlled throttle valve in the first of said passageways, a venturi in the second of said passageways on the atmosphere side of the throttle valve in said passageway, a suction responsive device communicating with the venturi in the second passageway, a throttle valve in the second passageway on the engine side of the venturi, said throttle valve being slightly open when the engine is idling, and means connecting said latter throttle valve with said suction device for controlling the opening and closing of said latter throttle valve whereby at low engine suction the charge is controlled by the manual valve and as the suction of the engine increases the suction device responds to the vacuum created by the air flowing through the venturi to open said throttle valve commensurately with the increasing velocity of the said air.

4. In an internal combustion engine having two separate intake passageways, a fuel nozzle in each passageway, a manually controlled throttle valve in the first of said passageways, a venturi in the second of said passageways on the atmosphere side of the throttle valve in said passageway, a suction responsive device communicating with the venturi in the second passageway, an unbalanced throttle valve in the second passageway, and means connecting said latter throttle valve with said suction device for controlling the opening and closing of said latter throttle valve whereby at low engine suction the charge is controlled by the manual valve and as the suction of the engine increases the suction device responds to the vacuum created by the air flowing through the venturi to open said throttle valve commensurately with the increasing velocity of the said air.

5. In an internal combustion engine having two separate intake passageways, a fuel nozzle in each passageway, a manually controlled throttle valve in the first of said passageways, a venturi in the second of said passageways on the atmosphere side of the throttle valve in said passageway, a suction responsive device communicating with the venturi in the second passageway, a throttle valve in the second passageway on the engine side of the venturi, said throttle valve being slightly open when the engine is idling, and means connecting said latter throttle valve with said suction device for controlling the opening and closing of said latter throttle valve, and resilient means tending to close said throttle valve in the second passageway whereby at low engine suction the charge is controlled by the manual valve and as the suction of the engine increases the suction device responds to the vacuum created by the air flowing through the venturi to open said throttle valve commensurately with the increasing velocity of the said air.

6. In an internal combustion engine having two separate intake passageways, a fuel nozzle in each passageway, a manually controlled throttle valve in the first of said passageways, a venturi in the second of said passageways on the atmosphere side of the throttle valve in said passageway, the first of said passageways having a smaller cross sectional area than the second of said passageways, a suction responsive device communicating with the venturi in the second passageway, a throttle valve in the second passageway on the engine side of the venturi, said throttle valve being slightly open when the engine is idling, and means connecting said latter throttle valve with said suction device for controlling the opening and closing of said latter throttle valve, and resilient means tending to close said throttle valve in the second passageway whereby at low engine suction the charge is controlled by the manual valve and as the suction of the engine increases the suction device responds to the vacuum created by the air flowing through the venturi to open said throttle valve commensurately with the increasing velocity of the said air.

7. In an internal combustion engine having two separate intake passageways, a fuel nozzle in each passageway, a manually controlled throttle valve in the first of said passageways, a venturi in the second of said passageways on the atmosphere side of the throttle valve in said passageway, the first of said passageways having a smaller cross sectional area than the second of said passageways, a suction responsive device communicating with the venturi in the second passageway, an unbalanced throttle valve in the second passageway, and means connecting said latter throttle valve with said suction device for controlling the opening and closing of said latter throttle valve whereby at low engine suction the charge is controlled by the manual valve and as the suction of the engine increases the suction device responds to the vacuum created by the air flowing through the venturi to open said throttle valve commensurately with the increasing velocity of the said air.

8. In an internal combustion engine having two separate intake passageways, a fuel nozzle in each passageway, a manually controlled throttle valve in the first of said passageways, a suction responsive device connected into the second of said passageways on the atmosphere side of the throttle valve in said passageway, a throttle valve in the second passageway, and means connecting said latter throttle valve with said suction device whereby at low engine suction the charge is controlled by the manual valve and at higher engine suction the suction device responds to increase in velocity of air flowing through said second passageway to open commensurately said throttle valve, and a lost motion connection between the said valves whereby the manually controlled throttle valve opens independently of the other valve and closing of the manually controlled throttle valve also closes the other valve.

9. In an internal combustion engine having two separate intake passageways, a fuel nozzle in each passageway, a manually controlled throttle valve in the first of said passageways, a venturi in the second of said passageways on the atmosphere side of the throttle valve in said passageway, a suction responsive device communicating with the venturi in the second passageway, a pivoted, unbalanced throttle valve in the second passageway on the engine side of the venturi, and means connecting said latter throttle valve with said suction device for controlling the opening and closing of said latter throttle valve, and resilient means tending to close said throttle valve in the second passageway whereby at low engine suction the charge is controlled by the manual valve and as the suction of the engine increases the suction device responds to the vacuum created by the air flowing through the venturi to open said throttle valve commensurately with the increasing velocity of the said air, and a lost motion connection between the two valves whereby the manually controlled throttle valve opens independently of the other valve and closing of the manually controlled throttle valve positively closes said other valve.

10. In an internal combustion engine of the type having a combustion chamber, the combination of two separate intake passageways adapted to lead into said combustion chamber, a fuel nozzle in each passageway, a manually controlled throttle valve in the first of said passageways, a suction responsive device connected into the second of said passageways on the atmosphere side of the throttle valve in said passageway, a throttle valve in the second passageway, a lost motion connection between said valves whereby said manually controlled valve can open independently of said second valve and said second valve can open only to the same degree as the manually controlled valve, and means connecting said latter throttle valve with said suction device whereby part of the engine charge is controlled by the manual valve and part of the engine charge is controlled pneumatically by the velocity of air flowing through said second passageway to open commensurately said latter throttle valve.

11. In an internal combustion engine of the type having a cylinder, the combination of two separate intake passageways adapted to lead into said cylinder, one of said intake passageways being smaller than the other, a fuel nozzle in each passageway, a manually controlled throttle valve in the smaller of said passageways, a venturi and a throttle valve in the larger passageway, a suction responsive device connected into the venturi in the larger of said passageways on the atmosphere side of the throttle valve in said larger passageway, a lost motion connection between said valves whereby said manually controlled valve can open independently of said second-mentioned valve and said second-mentioned valve can open only to the same degree as the manually controlled valve, and means connecting said second-mentioned throttle valve with said suction device whereby at low engine suction the charge is controlled by the manual valve and the small cross sectional area of the small passageway causes the fuel mixture to flow through the passageway at high velocity and retain the mixture thoroughly mixed and at higher engine suction the suction device responds to increase in velocity of air flowing through said larger passageway to open commensurately said second-mentioned throttle valve.

12. In an internal combustion engine having two separate intake passageways, a fuel nozzle in each passageway, the first of said intake passageways having a venturi therein which serves as a restriction which prevents the engine from breathing freely at higher engine suction but permits the engine to breathe freely at lower engine suction, a manually controlled throttle valve in the first of said passageways, a suction responsive device connected into the second of said passageways on the atmosphere side of the throttle valve in said passageway, a throttle valve in the second passageway, a lost motion connection between said valves whereby said manually controlled valve can open independently of said second valve and said second valve can open only to the same degree as the manually controlled valve, and means connecting said second throttle valve with said suction device whereby at low engine suction the charge is controlled by the venturi in the first of said passageways when the manual valve is wide open and at higher engine suction the suction device responds to increase in velocity of air flowing through said second passageway to open commensurately said second throttle valve.

MARION MALLORY.